(No Model.)
S. R. STODDARD.
PHOTOGRAPHIC APPARATUS.
No. 257,408. Patented May 2, 1882.
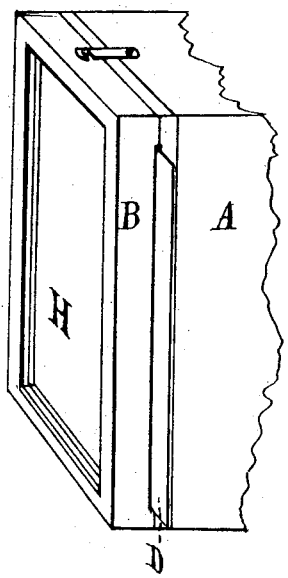
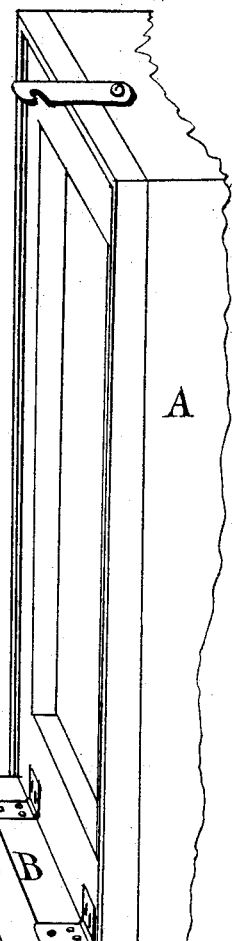
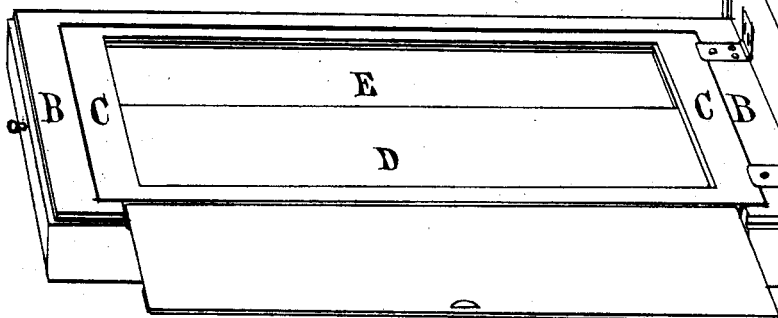
WITNESSES.
Hiram H. Wilson
Helen A. Stoddard
INVENTOR.
S. R. Stoddard

United States Patent Office.

SENECA R. STODDARD, OF GLENS FALLS, NEW YORK.

PHOTOGRAPHIC APPARATUS.

SPECIFICATION forming part of Letters Patent No. 257,408, dated May 2, 1882.

Application filed January 19, 1882. (No model.)

*To all whom it may concern:*

Be it known that I, SENECA R. STODDARD, of Glens Falls, county of Warren, State of New York, have invented a new and useful Improvement in Photographic Apparatus, of which the following is a specification.

My invention relates to an improved attachment for cameras, for use in dry-plate photography, by which the ordinary plate-holder containing a "cut-off" or light-excluding arrangement and spring for holding the sensitive plate in position is dispensed with and a thin envelope or shield with sliding front (which is part and parcel of this invention and applicable to all styles and sizes of cameras) substituted at a great saving of space and reduction in the cost of apparatus necessary.

In the accompanying drawings, Figure 1 is a view in perspective of a section of a camera with the attachment embodying my invention. Fig. 2 shows the same open with plate-holder therein and sliding shutter partially drawn out. Fig. 3 gives a transverse section of frame forming the attachment, showing the cut-off or light-excluding wicket and relative position of the various parts forming the whole.

Similar letters refer to similar parts in the different figures.

A is a section of the camera; and B, the attachment, which may be described as a frame hinged or pivoted at the back of camera A, rabbeted around its inner edges, so as to receive and hold the ground-glass frame G and plate-holder C, its outer edges corresponding to and fitting closely against those of the camera, excepting on one side, which is cut away sufficiently to admit of the passing in and out of the sliding shutter D, and furnished with a cut-off, F, which closes the aperture formed by the non-meeting edges of attachment B and camera A when shutter D is withdrawn.

C, the plate-holder, may be made of tin, wood, paper, or other suitable material of sufficient density to be impervious to light and substantial enough to receive and hold in position the sliding shutter D.

G is an adjustable frame, holding ground glass H, which, by means of springs at each end, (of which J, shown in Fig. 3, is one,) is pressed forward to take the place of plate-holder C when the latter is removed.

I is a spring, which, pressing against the flexible back of plate-holder C, keeps it, with its sensitive plate E, in true focal position during exposure. A button at B C, Fig. 2, and the extended ends of hinges, shown in same figure, keep the plate-holder and ground glass from being forced out of attachment B when the latter is not closed up in position for exposure.

By my invention the following advantages are gained:

I. *Cheapness.*—A large proportion of the cost of a practicable plate-holder has been due to the necessity of having with and forming a part of each a suitable spring for keeping the sensitive plate in focal position and a safe cut-off, which would close the opening out of which the sliding shutter must be drawn. By my invention the necessity for a spring and cut-off in each plate-holder is avoided, thereby materially reducing the cost of production.

II. *Economy of space.*—As the office of the shield is simply to protect the sensitized plate from the light until placed in the camera, it can be made of paper, tin, or other thin material having sufficient density to render it opaque, and occupy but little more space than the glass alone.

III. *Safety.*—As the negative glass is not subjected to the pressure of the spring at any time other than when placed in the camera for exposure, this fruitful cause of accident is removed, while, on the contrary, the smooth flexible back of the shield against which the plate lies flat tends to protect it, and so protected may be packed closely with any number of similar shields, with the danger of breakage reduced to a minimum.

IV. *Convenience.*—The ground glass and frame sliding forward into focal position when not pressed back by the plate-shield obviates the necessity for an additional hinged or removable frame, and is therefore always in true position for focusing.

I claim as new and of my invention—

1. The box C, for receiving the sensitive plate E, provided with the sliding shutter D, in combination with the attachment B, substantially in the manner and for the purposes herein described.

2. The attachment B, hinged or pivoted to the back of camera A, inclosing the ground-glass frame H and plate-holder C, and provided with a cut-off, F, which closes the opening formed by the non-meeting edges of attachment B and camera A when shutter D is withdrawn, substantially as and for purposes described.

3. The combination, in a camera, of the inner box, C, with an inclosing box or frame, B, having a spring or springs, I J, for holding the plate-holder C with its sensitive plate E in position, and having an aperture provided with a cut-off, through which the shutter D may be drawn, substantially as and for purposes specified.

4. The combination of the adjustable ground-glass frame G with plate-holder C and attachment B, as and for the purposes above described.

S. R. STODDARD.

Witnesses:
  HIRAM H. WILSON,
  HELEN A. STODDARD.